United States Patent [19]
Yui et al.

[11] 4,244,910
[45] Jan. 13, 1981

[54] METHOD FOR INJECTION MOLDING OF POLYOLEFIN CONTAINING INORGANIC FILLER

[75] Inventors: Hiroshi Yui; Yoshihiro Sobajima; Ryoichi Ichikawa; Shigekazu Ema, all of Yotsukaichi, Japan

[73] Assignee: Mitsubishi Petrochemical Co., Ltd., Tokyo, Japan

[21] Appl. No.: 78,755

[22] Filed: Sep. 25, 1979

[51] Int. Cl.³ .............................................. B29F 1/06
[52] U.S. Cl. .............................................. 264/328.12
[58] Field of Search .......................................... 264/328

[56] References Cited
U.S. PATENT DOCUMENTS
4,067,847  1/1978  Yui et al. .................... 264/328 X OTHER PUBLICATIONS
Injection Molding Theory and Practice, Irvin I. Rubin, John Wiley & Sons, N.Y., 1972, pp. 123–128, 436–437, and 444–446.

Primary Examiner—Thomas P. Pavelko
Attorney, Agent, or Firm—Sughrue, Rothwell, Mion, Zinn and Macpeak

[57] ABSTRACT

A method for molding a resin composition comprising a polyolefin and an inorganic filler to form a thin molded article, which comprises shooting said resin composition into a mold at such a high speed that its flow rate at the gate portion of the mold is at least 100 meters per second, thereby reducing the occurrence of short shots and the occurrence of mold flashing and making possible molding within a shorter period of time.

16 Claims, 6 Drawing Figures

FIG 6 INJECTION MOLDING MACHINE

METHOD FOR INJECTION MOLDING OF POLYOLEFIN CONTAINING INORGANIC FILLER

BACKGROUND OF THE INVENTION

1. Field of the Invention

This invention relates to a method for producing a molded article of thin wall thickness from a resin composition comprising a polyolefin and an inorganic filler.

2. Description of the Prior Art

Improvement of the rigidity, thermal stability, dimensional stability, incinerability, etc. of polyolefins by incorporating inorganic fillers has been extensively investigated and, in various fields, has already been achieved to a practical degree. In molding of polyolefins containing inorganic fillers, various methods such as extrusion molding and injection molding have been investigated. In extrusion molding, the addition of an inorganic filler increases the melt viscosity of the polyolefin and the moldability of the filler-containing polyolefin is better than that of the polyolefin alone. As a result, extrusion molding of inorganic filler-incorporated polyolefins has made great achievements in the field of sheet materials, etc.

On the other hand, in injection molding, the increase in melt viscosity brought about by the addition of inorganic fillers is not advantageous and tends to result in more short shots (i.e., incomplete injections) than in the case of molding the polyolefin alone. Attempts to avoid short shots by increasing the molding temperature and the injection pressure results in a tendency toward mold flashing. Thus, the range of molding conditions which afford good products is extremely limited and, for certain desired configurations, products of good quality cannot be obtained. Accordingly, in the field of injection molding, inorganic filler-incorporated polyolefins have not been considered suitable for the production of articles having complicated configurations or articles having a thin wall thickness. The application of filler-incorporated polyolefins have thus been greatly limited in spite of their better rigidity, thermal stability and dimensional stability in comparison to polyolefins alone.

SUMMARY OF THE INVENTION

It is an object of this invention to provide a method for injection molding a polyolefin containing an inorganic filler to which a wider range of molding conditions are applicable than in the case of molding polyolefins alone.

Another object of this invention is to provide a method for molding a polyolefin containing an inorganic filler in which injection molding is performed within a shorter period of time than in the case of molding a polyolefin alone.

Still another object of this invention is to provide a method for injection molding a polyolefin containing an inorganic filler, which can afford molded articles of thin thickness having much better dimensional stability than in the case of molding a polyolefin alone.

A further object of this invention is to provide a method for injection molding a polyolefin containing an inorganic filler, which can afford molded articles suitable in such fields as high-grade food receptacles, high-grade household goods, and precision parts in which conventional plastic shaped articles have not been found acceptable.

The present invention provides a method for molding a polyolefin containing an inorganic filler which is suitable for forming articles having a thin wall thickness, which comprises kneading a composition comprising 30 to 95% by weight of a polyolefin and 5 to 70% by weight of an inorganic filler, and injection-molding the kneaded composition by shooting it into a cavity having a shape which provides a molded article, the body or main portion of which has a thickness of about 0.2 to 1.0 mm at such a high speed that its flow rate at the gate portion of the mold is at least 100 meters per second.

BRIEF DESCRIPTION OF THE DRAWINGS

FIG. 6 is a view illustrating an injection molding machine which practices the method of this invention.

DETAILED DESCRIPTION OF THE INVENTION

Figure 1:
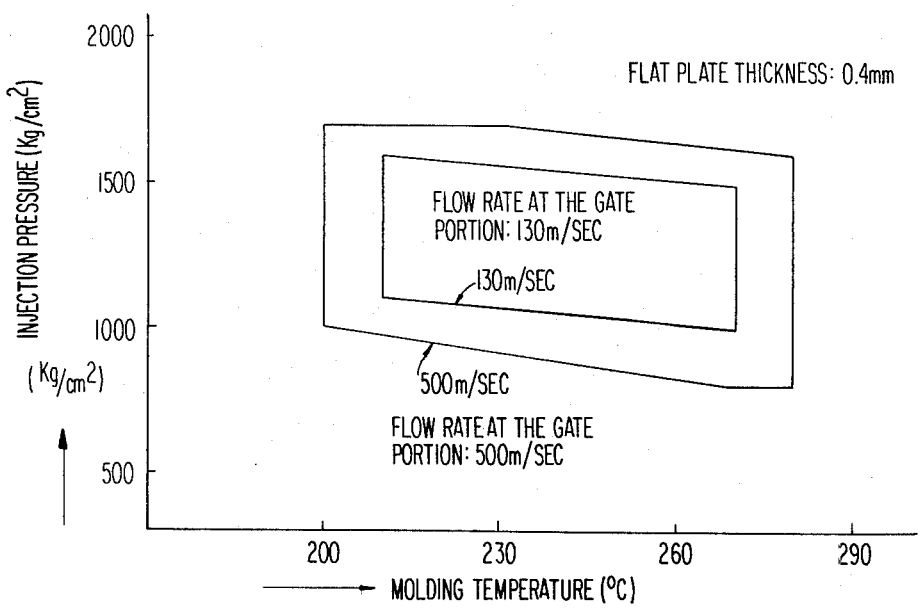
FIGS. 1, 2, 3 and 4 are characteristic diagrams showing the range of suitable molding conditions in Example 1 for molding polyolefin containing an inorganic filler.

Suitable polyolefins for use in this invention include homopolymers of alpha-olefins such as high-density polyethylene, low-density polyethylene, polypropylene and poly-4-methylpentene-1; copolymers of alpha-olefins with each other, such as an ethylene-propylene block or random copolymer, an ethylene-butene-1 block or random copolymer, a propylene-ethylene block or random copolymer or a propylene-butene-1 block or random copolymer; copolymers of alpha-olefins with vinyl monomers, such as an ethylene-vinyl acetate copolymer, an ethylene-acrylic acid copolymer or a maleic acid-grafted polypropylene; and mixtures of these with each other. In view of the rigidity and impact strength of a composition of the polyolefin, the propylene-ethylene block copolymer having an ethylene content of 2 to 15% by weight disclosed in British Pat. No. 1,362,912 is preferred as the polyolefin.

The melt flow rate as defined in ASTM-D1238 of the polyolefin is preferably as high as possible from the standpoint of the flowability of the composition. It is at least about 4 g/10 minutes, preferably at least about 10 g/10 minutes.

A melt flow rate less than 4 g/10 minutes results in poor moldability. From the standpoint of the moldability, a higher melt flow rate is desirable, but at some point the mechanical strength of the molding deteriorates. Therefore, a polyolefin having a melt flow rate of about 4 to 30 g/10 minutes, preferably about 10 to 30 g/10 minutes, is generally used. This does not imply that the upper limit of 30 g/10 minutes is critical, since a polyolefin having the melt flow rate of more than 30 g/10 minutes can be used in some cases.

Another resin, such as a polyamide, polycarbonate, polystyrene and an ABS resin, may be added to the polyolefin composition in an amount which will not impair the properties of the polyolefin, usually in an amount of not more than about 20% by weight.

Examples of the inorganic fillers are various carbonates, sulfates, silicates, oxides and hydroxides in fine powder form. Specifically, they include calcium carbonate (various grades including heavy, precipitated, and colloidal), magnesium carbonate, barium sulfate, calcium sulfate, calcium silicate, wollastonite, talc, clay, alumina, silica, iron oxide, mica, glass fibers, glass beads, hollow silica, hollow glass spheres, aluminum hydroxide, magnesium hydroxide, and basic magnesium carbonate. They may be used either alone or in combination with each other. Talc in platelet form is especially preferred.

Preferably, the inorganic filler has an average particle diameter of about 0.01 to 200 microns and preferably about 0.1 to 20 microns in the case of a particulate filler. In the case of a fibrous inorganic filler, its fiber diameter is preferably about 0.5 to 30 microns and preferably about 1 to 15 microns.

The composition for use in this invention comprises the polyolefin and the inorganic filler. The amount of the inorganic filler is desirably 5 to 70% by weight based on the total weight of the composition. If the amount of the inorganic filler is less than 5% by weight, improvement of moldability, rigidity, etc. due to the addition of the inorganic filler is slight. If the amount of the inorganic filler exceeds 70% by weight, injection molding of the composition becomes difficult. For case of molding and the full exhibition of the effects of the present invention, the amount of the inorganic filler is preferably from 15 to 60% by weight.

If desired, various additives may be incorporated in the composition of the polyolefin and the inorganic filler. Examples of these additives include phenolic antioxidants such as 2,6-di-tert.butyl-4-methyl phenol, 1,1,3-tri-(2-methyl-4-hydroxy-5-butylphenyl)butane, tetrakis[methylene(3,5-di-butyl-4-hydroxyhydrocinnamate)]methane and n-octadecyl-$\beta$-(4'-hydroxy-3',5'-di-butylphenyl)propionate; sulfur-type antioxidants such as dilauryl thiodipropionate, distearyl thiodipropionate, laurylstearyl thiodipropionate and tetrakis(methylene-3-dodecylthiopropionate); phosphorus-type antioxidants such as di(dinonylphenyl)-mono-(p-nonylphenyl)phosphite; higher fatty acids such as stearic acid and oleic acid; metal salts of higher fatty acids such as calcium stearate, magnesium stearate, aluminum stearate, zinc stearate, calcium oleate, magnesium oleate and aluminum oleate; higher fatty acid amides such as stearamide; higher fatty acid esters such as ethyl stearate; coloring agents such as carbon black, aniline black and titanium oxide; ultraviolet absorbers such as 2-(2'-hydroxy-3',5'-di-t-butylphenyl)-5-chlorobenzotriazole and 2-hydroxy-4-n-octoxy-benzophenone; antistatic agents such as monoglyceryl stearate and N,N-bis(2-hydroxyethyl)alkylamine; rubbers such as ethylene-propylene rubber, ethylene-propylenediene rubber, butadiene rubber and styrene-butadiene-styrene block copolymer; dispersants; copper (metal) deactivators; neutralizing agents; antifoamers; and fire retardants. These additives may be used alone or as a mixture.

To increase the dispersibility of the inorganic filler, it is effective to surface-modify the filler by various techniques, or to include a modifier at the time of kneading the filler with the polyolefin. The surface-modification may be effected by a general modifying procedure using various modifiers such as higher fatty acids or derivatives thereof, silane coupling agents, titanate coupling agents, maleic anhydride, and modified polypropylene. Needless to say, these modifiers may be included at the time of kneading the polyolefin composition.

Kneading of the composition is carried out using an ordinary kneading machine such as a single-screw extruder, a twin-screw extruder, a Banbury mixer, a roll, and a Brabender plastgrath. Usually, the composition is kneaded in an extruder to pelletize it, and then fed into an injection molding machine. In a special case, however, it is possible to feed the composition composed of the polyolefin and the inorganic filler directly into an injection molding machine, and mold it while kneading it in the machine. A suitable melt flow rate for the pelletized composition is at least about 3 g/10 minutes, and preferably at least about 10 g/10 minutes.

Injection molding of the kneaded composition is carried out under conditions such that the flow rate of the composition at the gate portion of a mold is at least 100 meters per second, preferably at least 400 meters per second.

In accordance with the present invention the flow rate of the resin composition is much higher than in the prior art; namely, the resin composition should be shot at a high speed. The configuration of the gate portion is optional, and a pinpoint gate, side gate, film gate, etc. may be used as required. The size of the gate is desirably large enough to facilitate high-velocity shooting. However, in view of the function of the gate, etc., it is desirably within the range of 0.4 to 3.0 mm in diameter in the case of a pinpoint gate. In the case of molding a polyolefin alone, the size of the pinpoint gate cannot be increased to more than 1.0 mm in diameter because a "roping" phenomenon occurs. In view of this fact, the ability to use a gate size of up to 3.0 mm in diameter makes the moldability of the resin composition advantageous. The number of molded articles which are produced in each molding cycle can be adjusted to one or any desired number.

The method of this invention is especially effective when it is applied to the production of a molded article whose main portion has a thickness of not more than 1 mm, especially 0.2 to 1 mm. The term "main portion" denotes that portion of the molded article apart from the special parts such as reinforcing parts (e.g., ribs, lattices, etc.), which in most cases is the walls of the article.

If the flow rate of the resin composition at the gate portion is less than 100 meters per second as in the prior art, the increased melt viscosity of the composition due to the inclusion of the inorganic filler tends to result in a short shot. Thus, the moldability of the composition is poor and molded products of good quality cannot be obtained. In some cases, it is even impossible to pour the composition into a mold. On the other hand, when the composition is shot at such a high speed that the flow rate of the kneaded composition at the gate portion of the mold is at least 100 meters per second, preferably at least 400 meters per second, molded articles of good quality can be obtained. Generally, in the production of molded articles having a thickness of not more than 1 mm, the molding resin stock is shot at an injection rate of at least 100 ml per second, and preferably at least 500 ml per second. The flow rate and injection rate of the stock at the gate portion of the mold are adjusted to the desired values immediately after starting injection, and, thereafter, are maintained at these set values until the end of injection. These conditions are desirable in regard to the dimensional stability of the molded article, the releasability of the molded article from the mold, and shortening the time required for molding.

The present invention is characterized by the fact that the resin stock is shot at a high speed. Accordingly, the molding machine used should have a mechanism capable of permitting high-speed shooting. Generally, to shoot the resin stock at a high speed, the injection pressure is desirably at least 800 kg/cm$^2$, and a desired value may be set within this range. From the standpoint of shortening the time required for molding and improving the dimensional stability of the molded article, high injection pressures of at least 1,300 kg/cm$^2$ are preferred.

An injection molding machine which can be operated at a high injection pressure is not useful unless it has a mechanism capable of permitting injection at high speeds. Generally employed as a high-speed injection molding machine is an injection molding machine having an oil accumulator connected to a source of a high-pressure gas such as shown, for example, in FIG. 6.

Referring to FIG. 6, an injection cylinder 2 is provided at the end of an extruder cylinder 1 with an injection ram 3 connected to a hydraulic cylinder 6 operable by an oil accumulator 5 having a high-pressure gas 4 introduced thereinto under pressure. The mold is equipped with a toggle type mold clamping system 10 actuated by a motor (not shown). In operation, an inorganic filler-containing polyolefin composition 7 molten and kneaded in the extruder cylinder 1 is fed into the injection cylinder 2 and stored. After a lapse of a certain period of time, a valve 8 is opened by instructions from control section (not shown), and the hydraulic cylinder 6 is actuated by the oil within the oil accumulator 5 whereby the injection ram 3 advances at a high speed to shoot the resin stock 7 within the injection cylinder 2 into a mold 9. The injection cylinder 2 is equipped with a valve, e.g. a ball valve, at the point where the kneaded composition 7 is fed to the cylinder which closes under the pressure of injection ram 3 and prevents kneaded composition from being forced back into extruder 1. The temperature of the mold is generally about 5° to 60° C.

The injection molding temperature is desirably set within the range of about 180° C. to 300° C. under the aforesaid various conditions. A characteristic feature of the present invention is that a resin stock having a melt viscosity increased by the inclusion of an inorganic filler can be molded at a temperature of as low as or less than 250° C. This is also very advantageous for shortening the time required for molding. A related characteristic feature of the present invention is that the injection molding conditions employed in molding an inorganic filler-containing polyolefin resin stock are generally broader than those which can be employed when molding a polyolefin resin alone. Hence, it is not only possible to shorten the molding time but to produce molded articles from inorganic filler containing polyolefin resins which are suitable for a wider range of applications.

The thickness of the molded article, as already mentioned above is optimally in the range of 0.2 to 1 mm at the main portion of the molded article. A molded article having a thickness of less than 0.2 mm is difficult to produce except when it is of a special or simple configuration since it is difficult to introduce the resin into the mold. On the other hand, if the thickness is above 1 mm, the improved moldability of the present invention is not essential. The commercial value of these molded products can be further increased by printing or coating their surfaces with an antistatic agent.

The following Examples illustrate the feasible range of molding conditions in the molding method of this invention. Comparisons are given to demonstrate the breadth of the aforesaid range. Some of the Examples also show that the time required for molding in this invention is very much shortened. Unless otherwise indicated all parts are parts by weight are per 100 parts by weight of the sum of the polyolefin and inorganic filler.

EXAMPLE 1

60% by weight of polypropylene having a melt flow rate of 15 g/10 minutes, 40% by weight of talc having an average particle diameter of 2 microns, 0.1 part tetrakis [methylene(3,5-t-butyl-4-hydroxyhydrocinnamate)]methane (stabilizer A), and 0.1 part distearyl thiodipropionate (stabilizer B) were kneaded by a twin-screw extruder. The resulting composition having a melt flow rate of 20 g/10 minutes was injection-molded at varying molding temperatures and injection pressures to form flat plates having a thickness of 0.4 mm or 0.8 mm, a length of 100 mm and a width of 80 mm while shooting the composition into a mold at such a speed that its flow rate at the gate portion of the mold was 130 m/sec., or 500 m/sec. The feasible range of molding conditions was determined.

For comparison, the feasible ranges of molding conditions were determined with respect to a resin composition composed of the same polypropylene as described above and the stabilizers A and B but not containing any inorganic filler. The gate used in each run was a side gate having a cross-sectional area of 0.01 cm$^2$.

Figure 2:
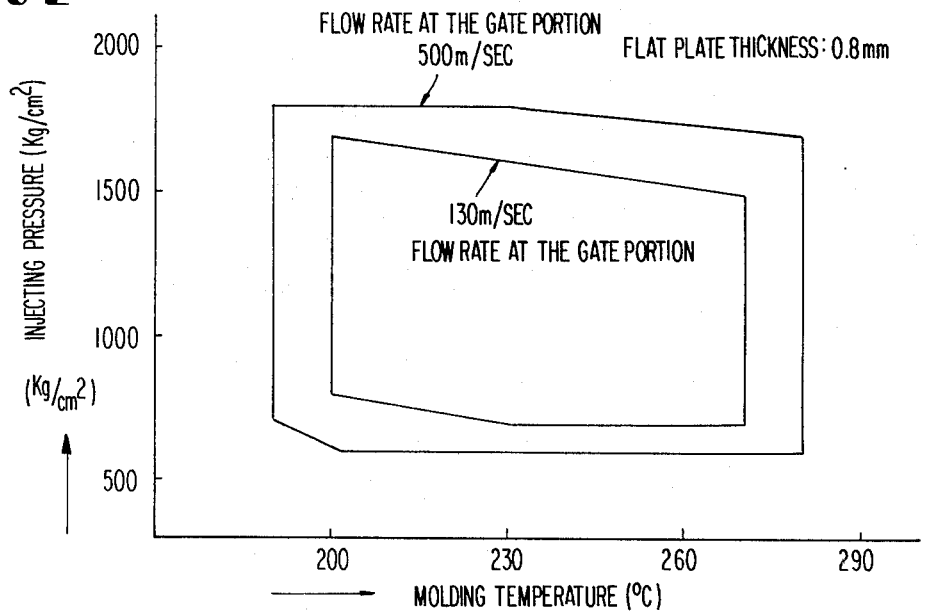
Figure 3:
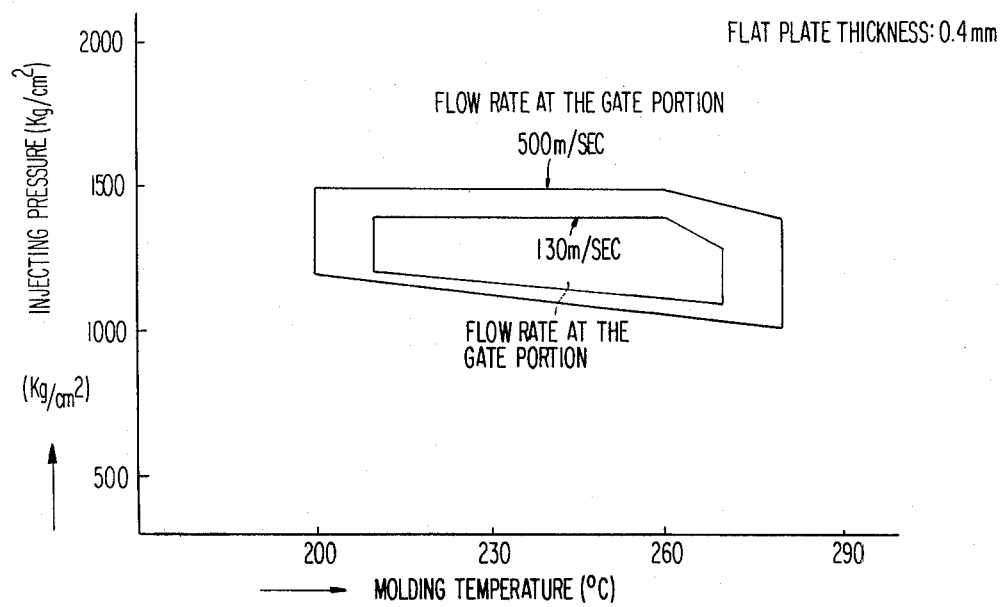
Figure 4:
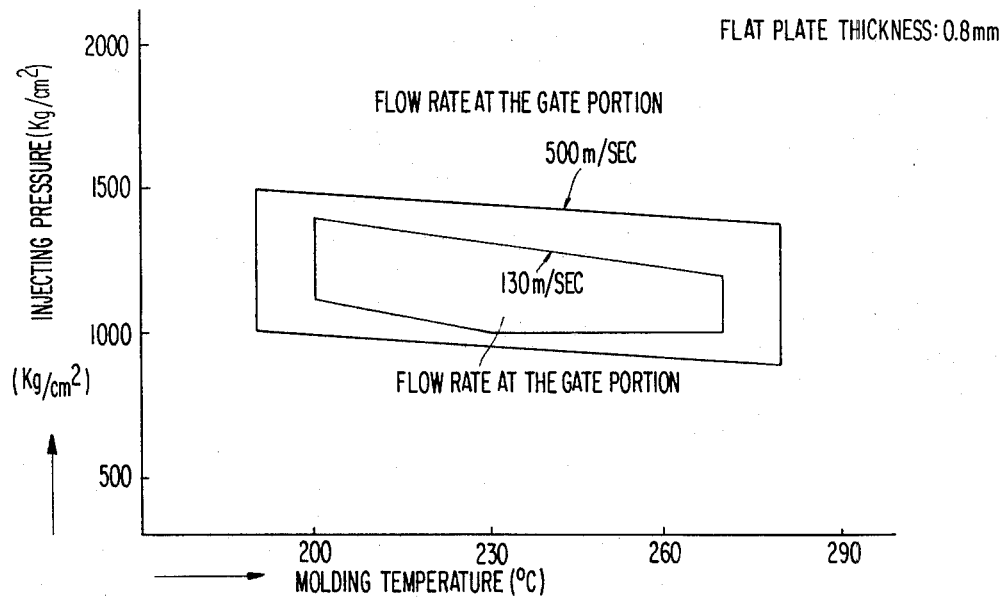

The test results are shown in FIGS. 1 to 4. The areas bounded by the lines represent feasible molding conditions. FIGS. 1 and 2 show the results of Example 1, and FIGS. 3 and 4 show the results of the Comparison. As is clearly seen from these diagrams, the feasible range of molding conditions is very broad in the molding method in accordance with Example 1 as compared with the Comparison. In particular, the feasible range of molding conditions is markedly broad when the flow rate of the gate portion is at least 400 m/sec. For the sake of comparison, when the flow rate at the gate portion was 90 m/sec., a short shot phenomenon occurred with both the talc-containing polypropylene and the polypropylene alone, and no feasible range existed.

EXAMPLE 2

A propylene-ethylene block copolymer having a melt flow rate of 20 g/10 minutes and an ethylene content of 6% and talc having an average particle diameter of 2 microns were mixed in varying proportions, and 0.1 part of stabilizer A and 0.1 part of stabilizer B were added to 100 parts of the resulting composition. The mixture was kneaded in a twin-screw extruder, and the kneaded composition was injection molded at a molding temperature of 230° C. and an injecting pressure of 1,400 kg/cm$^2$ while shooting the kneaded composition at a flow rate at the gate portion of 650 m/sec. at an injection rate of 580 ml/sec. to provide a cylindrical receptacle having a thickness of 0.6 mm, a diameter at its bottom of 70 mm and a height of 55 mm. The gate used was a pinpoint gate having a cross-sectional area of 0.009 cm$^2$.

Table 1 shows the time periods required for molding in this Example. The data for Comparisons in which the amount of the talc was less than 5% by weight are also shown.

TABLE 1

| Run No. | Amount of Talc (% by weight) | Molding Time (seconds) | Remarks |
| --- | --- | --- | --- |
| 1 | 6 | 8.5 | Invention |
| 2 | 16 | 7.0 | Invention |
| 3 | 30 | 6.5 | Invention |

TABLE 1-continued

| Run No. | Amount of Talc (% by weight) | Molding Time (seconds) | Remarks |
|---|---|---|---|
| 4 | 60 | 6.0 | Invention |
| 5 | 0 | 11.0 | Comparison |
| 6 | 3 | 10.5 | Comparison |

The data shown in Table 1 demonstrate that with the composition containing more than 5% by weight of talc, the time required for molding was shorter than with the compositions containing less than 5% by weight of the talc. In particular, with the compositions having more than 15% by weight of talc, the molding time was extremely short.

EXAMPLE 3

High-density polyethylene having a melt flow rate of 12 g/10 minutes was kneaded with each of the various fillers shown in Table 2 in a single-screw extruder. The kneaded composition was injection-molded at a molding temperature of 250° C. and an injecting pressure of 1,500 kg/cm² while shooting the composition into a mold at a flow rate at the gate portion of 600 m/sec and an injection rate of 540 ml/sec to obtain a cylindrical receptacle having the same dimension and configuration as in Example 2. The gate used was the same as that used in Example 2.

Table 2 shows the time periods required for molding in this Example, together with comparative data. It is seen from Table 2 that with the compositions of the Example, the time required for molding was shorter than with the comparative compositions.

TABLE 2

| Run No. | Inorganic Filler | Amount (wt. %) | Molding Time (seconds) | Remarks |
|---|---|---|---|---|
| 1 | Heavy calcium carbonate (average particle diameter: 2.5 microns) | 7 | 9.5 | Invention |
| 2 | Heavy calcium carbonate (average particle diameter: 2.5 microns) | 17 | 8.0 | Invention |
| 3 | Colloidal calcium carbonate (average particle diameter: 0.1 micron) | 7 | 9.0 | Invention |
| 4 | Colloidal calcium carbonate (average particle diameter: 0.1 micron) | 17 | 7.5 | Invention |
| 5 | Barium sulfate (average particle diameter: 0.4 micron) | 17 | 8.5 | Invention |
| 6 | Phlogopite (average particle diameter: 100 microns) | 17 | 8.5 | Invention |
| 7 | Heavy calcium carbonate | 4 | 11.0 | Comparison |
| 8 | Colloidal calcium carbonate | 4 | 11.0 | Comparison |
| 9 | Barium sulfate | 4 | 11.5 | Comparison |
| 10 | — | 0 | 12.0 | Comparison |

EXAMPLE 4

Figure 5:
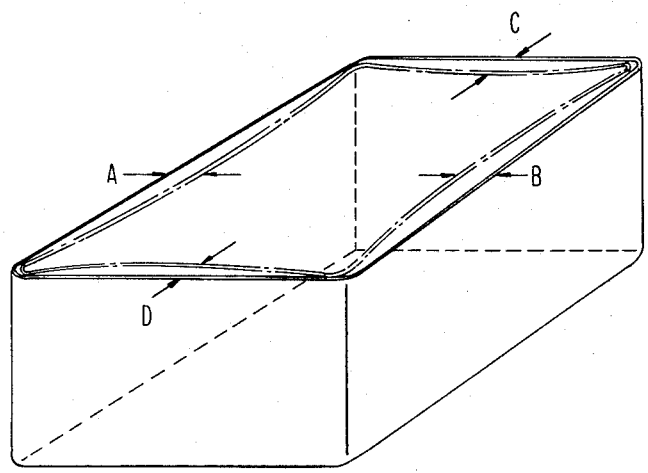
FIG. 5 is a perspective view of a receptacle obtained by the method of this invention.
Figure 5:
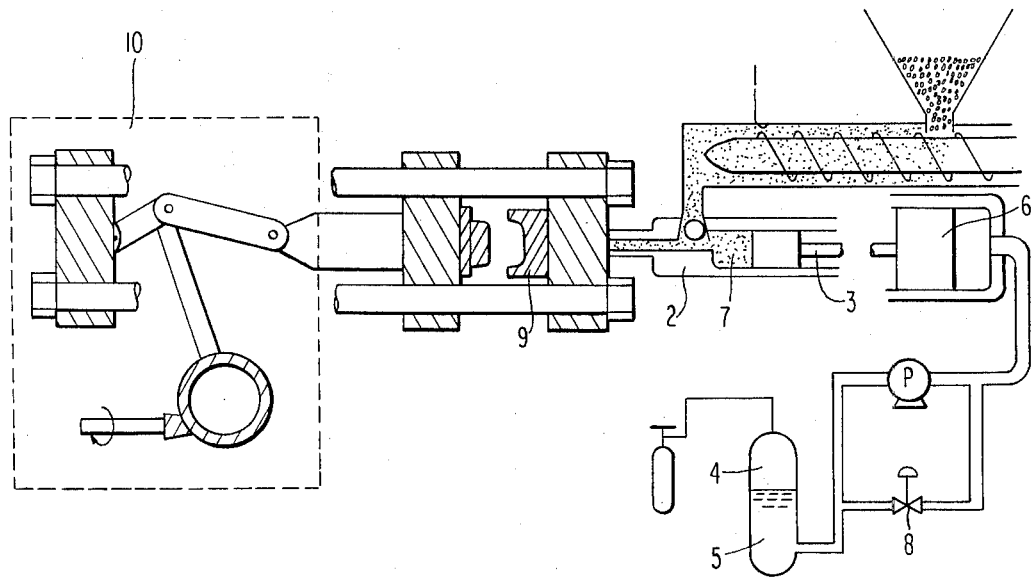

60% by weight of a propylene-ethylene block copolymer having a melt flow rate of 15 g/10 minutes and an ethylene content of 7%, 38% by weight of talc having an average particle diameter of 2 microns, 2% by weight of titanium oxide having an average particle diameter of 0.4 micron, 1 part stabilizer A and 1 part stabilizer B were kneaded in a twin-screw extruder. The resulting composition having a melt flow rate of 18 g/10 minutes was injection-molded at an injecting pressure of 1,600 kg/cm² and a molding temperature of 240° C. by a high-speed injection molding machine (T-388 PH, a product of Husky Company). The flow rate of the kneaded composition at the gate portion of the mold was adjusted to 750 m/sec immediately after starting the injection, and was maintained at this value until the end of the injection. Thus, a receptacle having a thickness of 0.5 mm, a width of 100 mm, a length of 140 mm and a height of 50 mm as shown in FIG. 5 was obtained. The gate used was a pinpoint gate having a cross-sectional area of 0.008 cm².

For comparison, 98% by weight of a propylene-ethylene block copolymer, 2% by weight of titanium oxide, 0.1 part stabilizer A and 0.1 part stabilizer B were kneaded in a twin-screw extruder. The same receptacle as above was prepared by injection molding from the resulting composition having a melt flow rate of 25 g/10 minutes using the same molding machine as above under the same molding conditions as above.

Table 3 summarizes the times required for molding in this Example together with the comparative data. The amounts of warpage of each molded article are also shown. The amounts of warpage of the receptacles shown in Table 3 were as follows: A and B are the amounts of warpage at the central portions of the side walls of the receptacle in the longitudinal direction, and C and D are the amounts of warpage at the central portions of the side walls in the transverse directions, as shown in FIG. 5.

TABLE 3

| Run | Molding Time (seconds) | Amount of Warpage (mm) | | | |
|---|---|---|---|---|---|
| | | A | B | C | D |
| Invention | 5.5 | 0.3 | 0.2 | 0.2 | 0.1 |
| Comparison | 8.5 | 2.0 | 2.0 | 1.5 | 1.2 |

From the above Examples, it is concluded that the reason for the broad feasible range of molding conditions, especially the flow rate of the resin stock at the gate portion and the thickness of the molded article, is that short shots or mold flashes are less than in the case of molding a polyolefin alone. Furthermore, the reason that injection molding is possible within a shorter period of time is believed primarily due to the fact that the rigidity and thermal conductivity of the molded article increase as a result of the inclusion of an inorganic filler, and therefore, the molded product is cooled rapidly and its rigidity increases so that its releasability from the mold is markedly improved.

As stated in detail hereinabove, according to the molding method of this invention, the feasible range of molding conditions can be broadened in comparison to the case of molding a polyolefin alone, and the filler-incorporated polyolefin can be injection-molded within a shorter period of time than in the case of a polyolefin alone. In addition, a molded article having a thickness of not more than 1 mm has markedly improved dimensional stability as a result of incorporation of the inorganic filler. Thus, the molded product has a high commercial value with reduced warpage, sinks and distortion as compared with molded products from a polyolefin alone.

These effects are conducive to the utility of the resulting molded articles, and the results are very great.

Specifically, since molded articles having light weight, high rigidity and good dimensional stability can be obtained economically by high-speed molding, they can be suitable for application in the fields of high-grade food receptacles, high-grade household goods, precision parts, etc.

While the invention has been described in detail and with reference to specific embodiments thereof, it will be apparent to one skilled in the art that various changes and modifications can be made therein without departing from the spirit and the scope thereof.

What is claimed is:

1. A method for molding a polyolefin containing an inorganic filler to form articles having a thin wall thickness, which comprises kneading a composition comprising 30 to 95% by weight of a polyolefin and 5 to 70% by weight of an inorganic filler, and injection-molding the kneaded composition by shooting it into a cavity having a shape which will give a molded article the main portion of which has a thickness of about 0.2 to 1.0 mm at such a high speed that its flow rate at the gate portion of a mold is at least about 100 meters per second.

2. The method of claim 1, wherein said inorganic filler is at least one member selected from the group consisting of calcium carbonate, magnesium carbonate, barium sulfate, calcium sulfate, calcium silicate, wollastonite, talc, clay, alumina, silica, iron oxide, mica, glass fibers, glass beads, hollow silica, hollow glass spheres, aluminum hydroxide, magnesium hydroxide and basic magnesium carbonate.

3. The method of claim 1, wherein said inorganic filler is talc, calcium carbonate or both.

4. The method of claim 1, wherein said inorganic filler has an average particle diameter of about 0.01 to 200 microns.

5. The method of claim 1, wherein said polyolefin is at least one member selected from the group consisting of homopolymers of alpha-olefins, copolymers of alpha-olefins with each other and copolymers of alpha-olefins with vinyl monomers.

6. The method of claim 1, wherein said polyolefin is a propylene-ethylene block copolymer having an ethylene content of about 2 to 15% by weight.

7. The method of claim 1, wherein the flow rate of said kneaded composition at the gate portion is at least about 400 meters per second.

8. The method of claim 1, wherein said resin is injected at a rate of at least about 100 ml/sec.

9. The method of claim 1, wherein said injection-molding is conducted at an injection pressure of at least about 800 kg/cm$^2$.

10. The method of claim 1, wherein said injection molding is conducted at about 180° to 300° C.

11. The method of claim 1, wherein said kneaded composition has a melt flow rate of at least about 4 g/10 minutes.

12. The method of claim 1, wherein said kneaded composition is injected at a rate of about 500 ml/sec.

13. The method of claim 1, wherein said injection pressure is at least about 1,300 kg/cm$^2$.

14. The method of claim 1, wherein said resin composition contains not more than about 20% by weight of another resin.

15. The method of claim 1, wherein upon kneading said composition is pelletized.

16. The method of claim 1, wherein the amount of said filler is about 15 to 60% by weight.

* * * * *

UNITED STATES PATENT AND TRADEMARK OFFICE
CERTIFICATE OF CORRECTION

PATENT NO. : 4,244,910
DATED : January 13, 1981
INVENTOR(S) : Hiroshi Yui et al

It is certified that error appears in the above—identified patent and that said Letters Patent is hereby corrected as shown below:

On the first page of the patent, between "[22] Filed: Sep. 25, 1979" and "[51] Int. Cl.$^3$....B29F 1/06" insert --[30] Foreign Priority Data Sep. 25, 1978 [JP] Japan..........53-116639--

Signed and Sealed this

Twenty-ninth Day of September 1981

[SEAL]

Attest:

GERALD J. MOSSINGHOFF

Attesting Officer

Commissioner of Patents and Trademarks